United States Patent
Kim et al.

(10) Patent No.: US 9,140,343 B1
(45) Date of Patent: Sep. 22, 2015

(54) TRANSMISSION SYSTEM OF HYBRID ELECTRIC VEHICLE

(71) Applicant: Hyundai Motor Company, Seoul (KR)

(72) Inventors: Baekyu Kim, Whasung-Si (KR); Insup Kim, Whasung-Si (KR); Seokjoon Kim, Whasung-Si (KR); Hyunsup Kim, Whasung-Si (KR); Sunggon Byun, Whasung-Si (KR); Heera Lee, Whasung-Si (KR); Chulmin Ahn, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/557,661

(22) Filed: Dec. 2, 2014

(30) Foreign Application Priority Data

Sep. 23, 2014 (KR) .................. 10-2014-0126784

(51) Int. Cl.
| | |
|---|---|
| *B60K 6/365* | (2007.10) |
| *B60K 6/445* | (2007.10) |
| *F16H 37/04* | (2006.01) |
| *B60K 6/442* | (2007.10) |
| *F16H 57/04* | (2010.01) |

(52) U.S. Cl.
CPC .............. *F16H 37/046* (2013.01); *B60K 6/442* (2013.01); *F16H 57/0476* (2013.01); *B60K 6/365* (2013.01); *B60K 6/445* (2013.01); *F16H 2037/048* (2013.01); *F16H 2200/0021* (2013.01); *F16H 2200/2005* (2013.01); *Y10S 903/917* (2013.01)

(58) Field of Classification Search
CPC ................................................. F16H 2200/0021
See application file for complete search history.

(56) References Cited

U.S. PATENT DOCUMENTS

| | | | |
|---|---|---|---|
| 6,910,981 B2 | 6/2005 | Minagawa et al. | |
| 7,189,177 B2 | 3/2007 | Takasu et al. | |
| 8,337,352 B2 | 12/2012 | Morrow et al. | |
| 2013/0090202 A1* | 4/2013 | Hiraiwa | 475/5 |
| 2014/0378258 A1* | 12/2014 | Kim et al. | 475/5 |

FOREIGN PATENT DOCUMENTS

| | | | |
|---|---|---|---|
| JP | 2000-94973 A | | 4/2000 |
| JP | 2012116435 A | * | 6/2012 |
| JP | 2013-119280 A | | 6/2013 |

* cited by examiner

*Primary Examiner* — Tisha Lewis
(74) *Attorney, Agent, or Firm* — Morgan, Lewis & Bockius LLP

(57) ABSTRACT

A transmission system of a hybrid electric vehicle may include first and second motor/generators, a planetary gear set, first and second output gears, and first and second clutches on an axis of an input shaft receiving torque of an engine in a transmission housing, a hollow shaft disposed at a radial exterior of the input shaft and adapted to transmit the torque of the engine or torque of the first motor/generator to the second output gear, an outer shaft disposed at a radial exterior of the hollow shaft and adapted to transmit torque of the second motor/generator to the first output gear, and a rear cover coupled to a rear end portion of the transmission housing, in which the planetary gear set includes a sun gear, a planet carrier and a ring gear as rotation elements thereof.

11 Claims, 5 Drawing Sheets

TRANSMISSION SYSTEM OF HYBRID ELECTRIC VEHICLE

CROSS-REFERENCE TO RELATED APPLICATION

The present application claims priority to Korean Patent Application No. 10-2014-0126784 filed Sep. 23, 2014, the entire contents of which is incorporated herein for all purposes by this reference.

BACKGROUND OF THE INVENTION

1. Field of the Invention

The present invention relates to a transmission system of a hybrid electric vehicle. More particularly, the present invention relates to a transmission system of a hybrid electric vehicle that can achieve electric vehicle (EV), continuation mode and parallel mode including direct-coupling and overdrive (OD).

2. Description of Related Art

Generally, a hybrid electric vehicle is a vehicle which uses two different power sources efficiently.

Such a hybrid electric vehicle typically uses an engine and a motor/generator. The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depend on connections of the planetary gear sets, the motor/generators, and the torque delivery apparatus.

In addition, the power transmission system of the multi-mode type has different features such a durability, power delivery efficiency, and size depend on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission system of a hybrid electric vehicle having advantages of easily fixing a sun gear to a rear cover by positioning a planetary gear set disposed on an input shaft at a rearmost portion of a transmission housing and achieving a compact design by causing axial load to be supported by the rear cover.

In addition, various aspects of the present invention are directed to providing a transmission system of a hybrid electric vehicle that can connect a ring gear of a planetary gear set and a first motor/generator without an additional connecting shaft.

In addition, various aspects of the present invention are directed to providing a transmission system of a hybrid electric vehicle which can reduce parking impact by disposing a parking gear on an outer shaft having relatively large inertia.

In addition, various aspects of the present invention are directed to providing a transmission system of a hybrid electric vehicle where a valve body and a tank for collecting churning oil are disposed above a first clutch disposed between a second motor/generator and an engine. Therefore, cooling oil is supplied to the second motor/generator easily when the vehicle runs at EV mode and a space in a transmission housing is efficiently utilized.

According to various aspects of the present invention, a transmission system of a hybrid electric vehicle may include first and second motor/generators, a planetary gear set, first and second output gears, and first and second clutches on an axis of an input shaft receiving torque of an engine in a transmission housing, a hollow shaft disposed at a radial exterior of the input shaft and adapted to transmit the torque of the engine or torque of the first motor/generator to the second output gear, an outer shaft disposed at a radial exterior of the hollow shaft and adapted to transmit torque of the second motor/generator to the first output gear, and a rear cover coupled to a rear end portion of the transmission housing, in which the planetary gear set may include a sun gear, a planet carrier and a ring gear as rotation elements thereof and is disposed on a rear end portion of the input shaft in the transmission housing such that the sun gear is directly fixed to the rear cover.

The first clutch, the second output gear, the first output gear, the second motor/generator, the second clutch, the first motor/generator and the planetary gear set may be sequentially dispose from an engine side to a rear of the transmission housing.

The transmission system may further include a parking gear disposed between the first output gear and the second output gear and connected to the outer shaft.

A snap ring for fixing the parking gear in an axial direction and a fixing ring for fixing the snap ring in the axial direction and in a radial direction may be mounted on the outer shaft.

The sun gear of the planetary gear set may be splined to a fixed shaft integrally protruded from the rear cover in an axial direction.

The planet carrier of the planetary gear set may be rotatably supported on an exterior circumference of the sun gear by a ball bearing.

The first clutch may be splined to the input shaft at an opposite side of the first output gear with reference to the second output gear.

The second clutch may be rotatably supported on the input shaft and the outer shaft by ball bearings between the first and second motor/generators.

A snap ring for fixing a hub connected to the second motor/generator in an axial direction and a fixing ring for fixing the snap ring in the axial direction and in a radial direction may be mounted on the outer shaft.

The second clutch may be connected to the ring gear of the planetary gear set through a hub connected to the first motor/generator.

A valve body and a tank for collecting churning oil may be disposed above the first clutch in the transmission housing.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
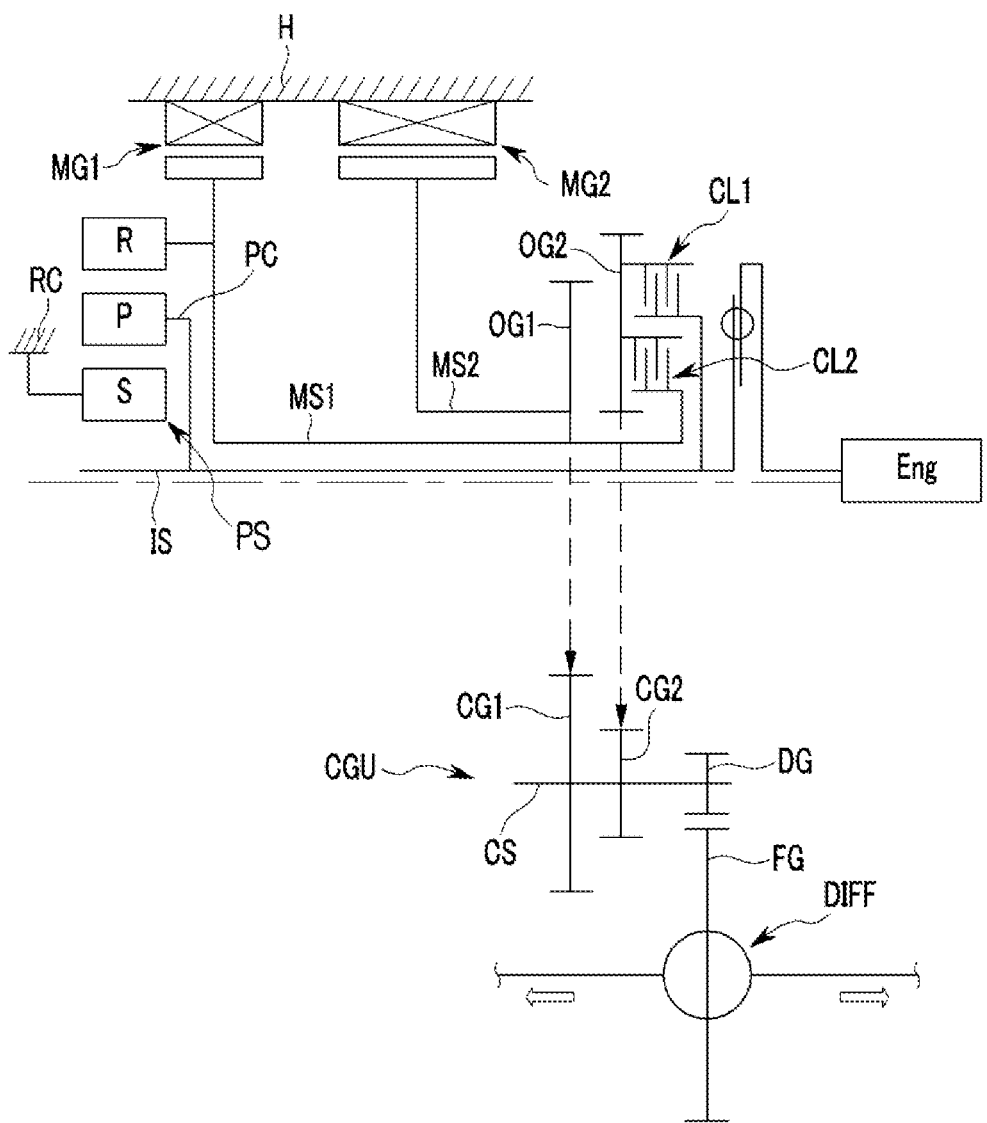
FIG. 1 is a schematic diagram of an exemplary transmission system of a hybrid electric vehicle according to the present invention.

FIG. 1 is a schematic diagram of a transmission system of a hybrid electric vehicle according to various embodiments of the present invention.

Referring to FIG. 1, a transmission system of a hybrid electric vehicle according to various embodiments of the present invention change torques of an engine Eng and first and second motor/generators MG1 and MG2 according to running state of the vehicle and outputs the changed torques through first and second output gears OG1 and OG2.

The transmission system includes the first and second motor/generators MG1 and MG2, a planetary gear set PS, the first and second output gears OG1 and OG2, first and second clutches CL1 and CL2, and a speed reduction unit CGU.

Each of the first motor/generator MG1 and the second motor/generator MG2 is independent power source and operates as a motor or a generator.

The first motor/generator MG1 is directly connected to a ring gear R of the planetary gear set PS so as to be operated as a start motor for starting the engine or to be operated as a generator generating electricity by using the torque of the engine through the ring gear R.

The second motor/generator MG2 is directly connected to the first output gear OG1 through an outer shaft MS2 so as to be operated as a motor supplying the torque to the first output gear OG1.

For this purpose, a stator of the first motor/generator MG1 and a stator of the second motor/generator MG2 are respectively fixed to a transmission housing H, and a rotor of the first motor/generator MG1 and a rotor of the second motor/generator MG2 are connected respectively to the ring gear R of the planetary gear set PS and the first output gear OG1.

The first and second motor/generators MG1 and MG2 and the planetary gear set PS are disposed on an input shaft IS.

At this time, the first output gear OG1 is operated as an output gear outputting the torque of the second motor/generator, and the second output gear OG2 is operated as an output gear outputting the torque of the engine Eng received through the planetary gear set PS.

In addition, the first and second clutches CL1 and CL2 may be a conventional multi-plate friction element, and connect one rotation body to another rotation body.

The transmission system of a hybrid electric vehicle will be described in detail.

The planetary gear set PS is a single pinion planetary gear set, and includes a sun gear S, a planet carrier PC rotatably supporting a pinion P externally engaged with the sun gear S, and the ring gear R internally engaged with the pinion P as rotation elements thereof.

The sun gear S is operated as a fixed element, the planet carrier PC is connected to the input shaft IS, and the ring gear R is operated as an output element and is connected to the first motor/generator MG1.

The first motor/generator MG1 is connected to the ring gear R of the planetary gear set PS so as to be operated as a motor for driving the ring gear R or to be operated as a generator generating electricity by torque of the ring gear R. The first motor/generator MG1 is selectively connected to the second output gear OG2 through a hollow shaft MS1.

The second motor/generator MG2 is connected to the first output gear OG1 and transmits torque to the first output gear OG1.

The first clutch CL1 is a clutch operating at underdrive (UD) and is disposed between the input shaft IS and the second output gear OG2. The first clutch CL1 selectively connects the input shaft IS and the second output gear OG2 so as to transmit the torque of the engine Eng to the second output gear OG2 without speed change.

The second clutch CL2 is a clutch operating at overdrive (OD) and is disposed between the hollow shaft MS1 connected to the ring gear R of the planetary gear set PS and the first motor/generator and the second output gear OG2. The second clutch CL2 selectively connects the hollow shaft MS1 and the second output gear OG2 so as to increase rotation speed of the engine Eng through the planetary gear set PS and transmit the increased rotation speed to the second output gear OG2.

In addition, rotation speeds of the first and second output gears OG1 and OG2 is decreased by the speed reduction unit CGU, and the decreased rotation speed is transmitted to a final reduction gear FG of a differential apparatus DIFF.

The speed reduction unit CGU is disposed between the input shaft IS and the differential apparatus DIFF. The speed reduction unit CGU includes an intermediate shaft CS disposed in parallel with the input shaft IS, a first intermediate gear CG1 fixedly disposed on an end portion of the intermediate shaft CS and engaged with the first output gear OG1, and a second intermediate gear CG2 fixedly disposed on a middle portion of the intermediate shaft CS and is engaged with the second output gear OG2.

In addition, a drive gear DG is fixedly disposed on the other end portion of the intermediate shaft CS and is engaged with the final reduction gear FG of the differential apparatus DIFF.

Since diameters of the first and second intermediate gears CG1 and CG2 are larger than that of the drive gear DG, the speed reduction unit CGU decreases rotation speeds of the first and second output gears OG1 and OG2 and transmits the decreased rotation speed to the final reduction gear FG.

The transmission system of a hybrid electric vehicle can achieve EV mode, continuation mode, and parallel mode including direct-coupling and OD.

Neither of the first and second clutches CL1 and CL2 is operated at the EV mode and the continuation mode, the first clutch CL1 is operated at the direct-coupling of the parallel mode, and the second clutch CL2 is operated at the OD of the parallel mode.

At this time, underdrive (UD), 1:1 and overdrive (OD) can be achieved according to gear ratios of the first and second intermediate gears CG1 and CG2 engaged with the first and second output gears OG1 and OG2 and the drive gear DG of the speed reduction unit CGU at the direct-coupling of the parallel mode.

In further detail, none of the clutches is operated at the EV mode.

The engine Eng is maintained in a stopped state and the planetary gear set PS is not directly involved shift at the EV mode. In addition, an electric continuously variable transmission is achieved by the torque of the second motor/generator MG2 transmitted to the first output gear OG1.

That is, the second motor/generator MG2 is transmitted to the final reduction gear FG of the differential apparatus DIFF through the outer shaft MS2, the first output gear OG1, the first intermediate gear CG1, and the drive gear DG.

None of the clutches is operated at the continuation mode.

If the engine Eng is started at the EV mode, the continuation mode is achieved. At this time, electric power generated by the first motor/generator MG1 is supplied to the second motor/generator MG2 as drive power.

Meanwhile, the engine Eng is started by the first motor/generator MG1.

That is, if the first motor/generator MG1 is operated and the torque of the first motor/generator MG1 is input to the ring gear R of the planetary gear set PS, the sun gear S is operated as the fixed element. Therefore, the decreased rotation speed is output through the planet carrier PC.

In this case, the torque is input to the engine Eng through the input shaft IS connected to the planet carrier PC such that the engine Eng is started.

After the engine Eng is started, the first motor/generator MG1 receives the torque of the engine Eng through the ring gear R and generates electric power.

The planetary gear set PS is not directly involved in shift and an electric continuously variable transmission is achieved by the torque of the second motor/generator MG2 at the continuation mode.

At this time, the planetary gear set PS is involved in the starting of the engine Eng and power generation of the first motor/generator MG1.

The torque of the second motor/generator MG2 is transmitted to the final reduction gear FG of the differential apparatus DIFF through the outer shaft MS2, the first output gear OG1, the first intermediate gear CG1, and the drive gear DG at the continuation mode.

At this time, the second motor/generator MG2 uses the electric power generated by the first motor/generator MG1 and remaining electric power may be charged in a battery.

The first clutch CL1 is operated at the direct-coupling of the parallel mode.

The torque of the engine Eng is used as main power and the torque of the second motor/generator MG2 is used as auxiliary power at the direct-coupling of the parallel mode.

The torque of the engine Eng is transmitted to the second output gear OG2 through the input shaft IS as main power by operation of the first clutch CL1, and the torque of the second motor/generator MG2 is transmitted to the first output gear OG1 as auxiliary power.

At this time, the torque of the engine Eng may be used for generating electric power by the first motor/generator MG1.

The planetary gear set PS is not directly involved in shift, and the shift is achieved by the torque of the engine Eng transmitted to the second output gear OG2 through the input shaft IS and the torque of the second motor/generator MG2 transmitted to the first output gear OG1 through the outer shaft MS2 at the direct-coupling of the parallel mode.

The torques of the engine Eng and the second motor/generator MG2 input to the first and second output gears OG1 and OG2 are transmitted to the final reduction gear FG of the differential apparatus DIFF through the first and second intermediate gears CG1 and CG2 and the drive gear DG.

The second clutch CL2 is operated at the OD of the parallel mode.

The torque of the engine Eng is used as main power and the torque of the second motor/generator MG2 is used as auxiliary power at the OD of the parallel mode.

That is, if the torque of the engine Eng is input to the planet carrier PC of the planetary gear set PS through the input shaft IS by operation of the second clutch CL2, the sun gear S is operated as the fixed element. Therefore, increased rotation speed is transmitted to the second output gear OG2 through the ring gear R. Simultaneously, the torque of the second motor/generator MG2 is transmitted to the first output gear OG1.

At this time, the torque of the engine Eng may be used for generating electric power by the first motor/generator MG1.

The planetary gear set PS is not directly involved in shift, and the shift is achieved by the torque of the engine Eng transmitted to the second output gear OG2 through the input shaft IS and the planetary gear set PS and the torque of the second motor/generator MG2 transmitted to the first output gear OG1 at the OD of the parallel mode.

The torques of the engine Eng and the second motor/generator MG2 input to the first and second output gears OG1 and OG2 are transmitted to the final reduction gear FG of the differential apparatus DIFF through the first and second intermediate gears CG1 and CG2 and the drive gear DG.

The transmission system of a hybrid electric vehicle will hereinafter be described in further detail.

Figure 2:
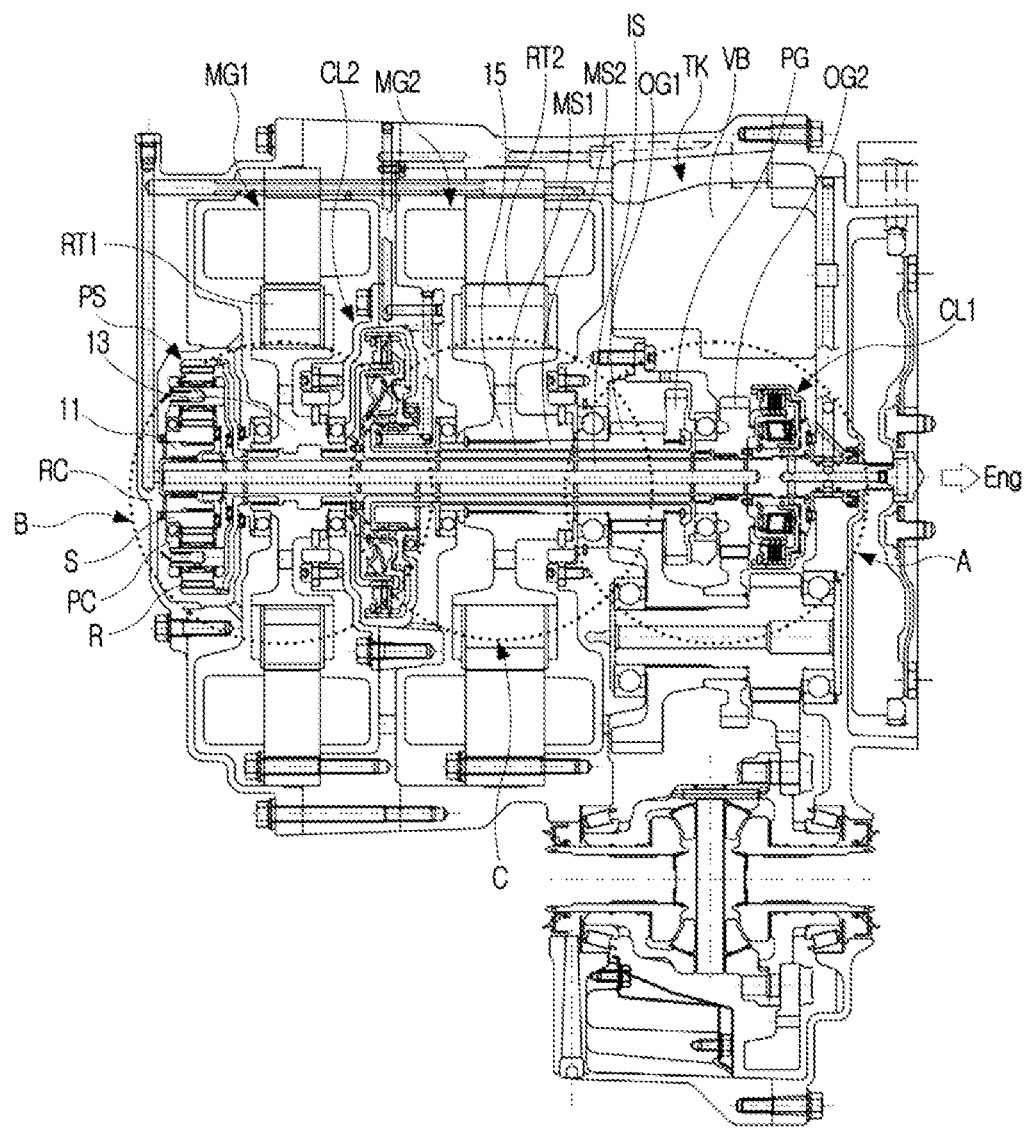
FIG. 2 is a cross-sectional view of an exemplary transmission system of a hybrid electric vehicle according to the present invention.
Figure 3:
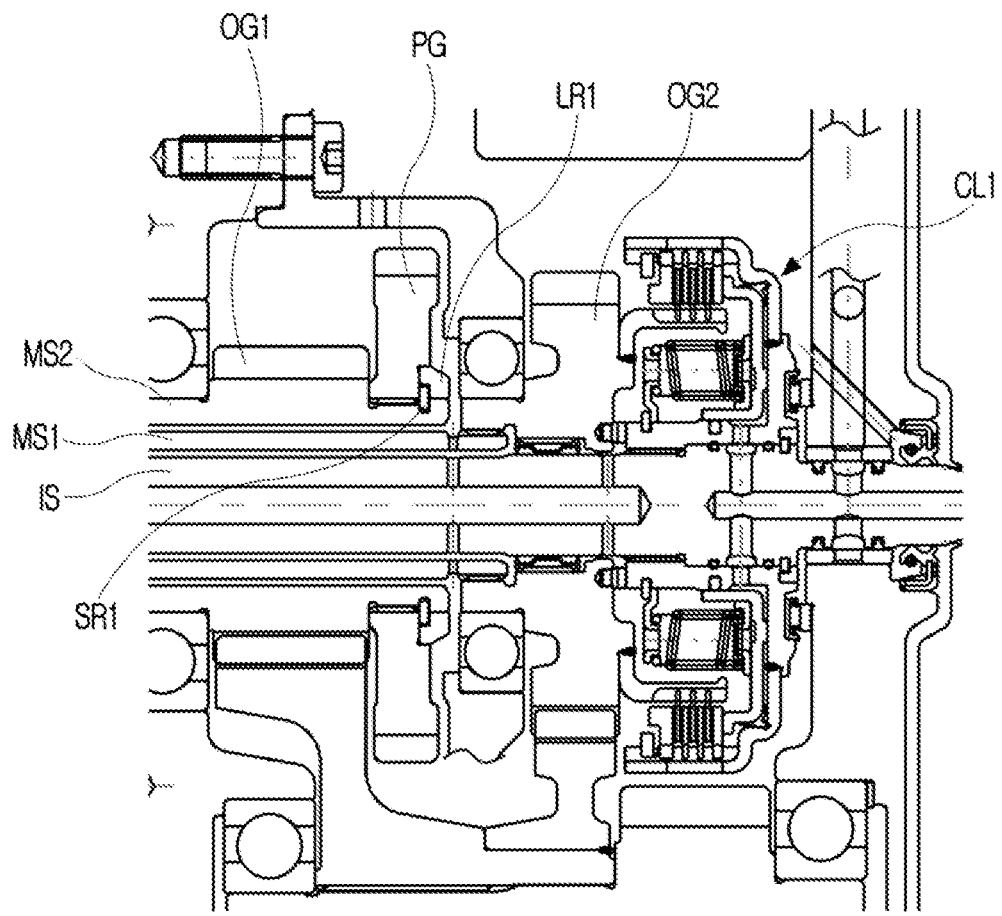
FIG. 3 is an enlarged cross-sectional view of A portion in FIG. 2.
Figure 4:
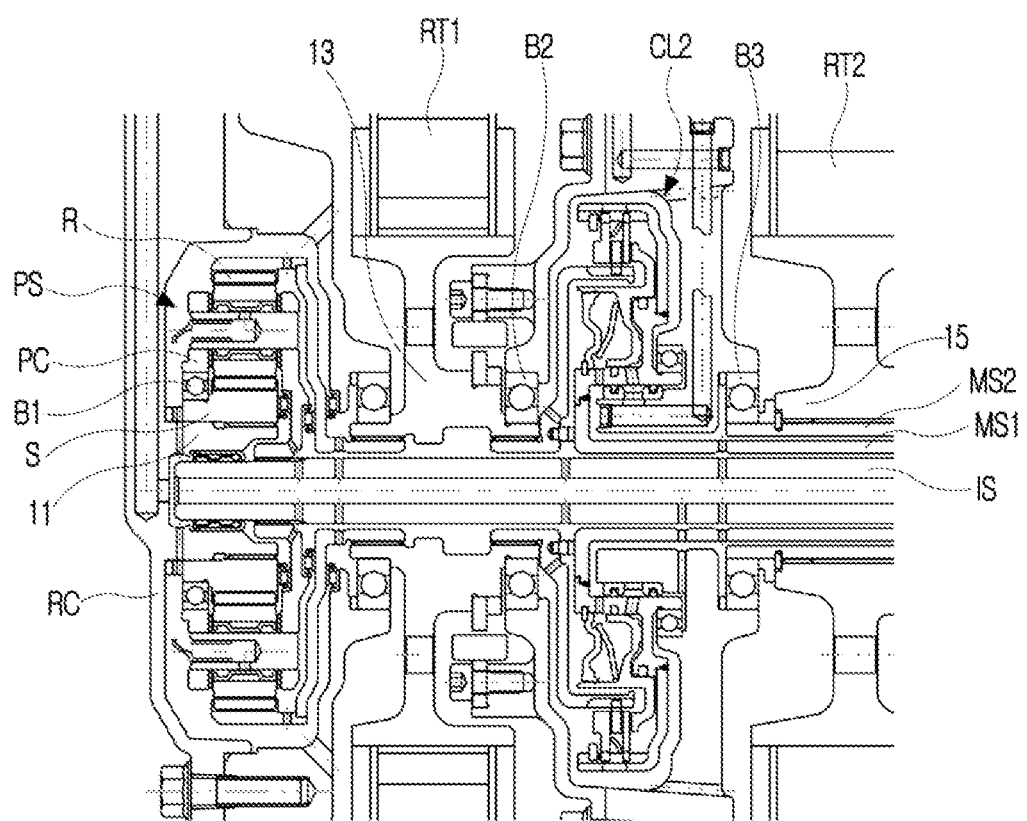
FIG. 4 is an enlarged cross-sectional view of B portion in FIG. 2.
Figure 5:
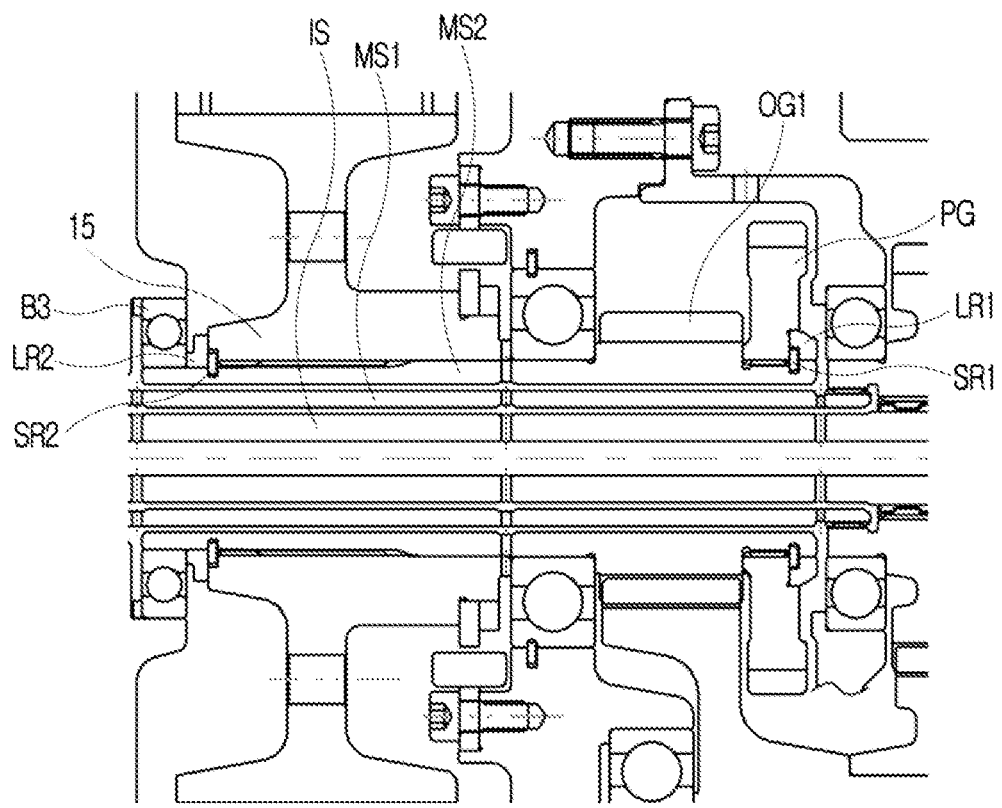
FIG. 5 is an enlarged cross-sectional view of C portion in FIG. 2.

FIG. 2 is a cross-sectional view of a transmission system of a hybrid electric vehicle according to various embodiments of the present invention, and FIG. 3, FIG. 4 and FIG. 5 are enlarged cross-sectional views of A portion, B portion and C portion in FIG. 2, respectively.

Referring to FIG. 2, the first and second motor/generators MG1 and MG2, the planetary gear set PS, the first output gear OG1 for the second motor/generator MG2, the second output gear OG2 for the engine Eng, the first clutch CL1 for the underdrive (UD) and the second clutch CL2 for the overdrive (OD) are disposed on an axis of the input shaft IS into which the torque of the engine Eng is input in the transmission system of a hybrid electric vehicle according to various embodiments of the present invention.

At this time, the first clutch CL1, the second output gear OG2, the first output gear OG1, the second motor/generator MG2, the second clutch CL2, the first motor/generator MG1 and the planetary gear set PS are sequentially disposed on the axis of the input shaft IS from the engine Eng to the rear.

In addition, the hollow shaft MS1 for transmitting the torque of the engine Eng or the torque of the first motor/generator MG1 to the second output gear OG2 is disposed at a radial exterior of the input shaft IS concentrically with the input shaft IS, and the outer shaft MS2 for transmitting the torque of the second motor/generator MG2 to the first output gear OG1 is disposed at a radial exterior of the hollow shaft MS1.

At this time, referring to FIG. 3, a parking gear PG is disposed between the first output gear OG1 and the second output gear OG2 and is splined to the outer shaft MS2.

That is, since the parking gear PG is connected to the outer shaft MS2 having relatively large inertia, parking impact may be reduced.

In addition, movement of the parking gear PG connected to the outer shaft MS2 in an axial direction is limited by a snap ring SR1 mounted on the outer shaft MS2, and the snap ring SR1 is fixed to the outer shaft MS2 by the fixing ring LR1 in the axial direction and in a radial direction such that decoupling of the snap ring SR1 is prevented when rotating with high speed.

Referring to FIG. 4, the planetary gear set PS is disposed at an opposite side (at the rearmost) of the engine Eng on the input shaft IS, and the sun gear S is fixed to a rear cover RC coupled to a rear end portion of the transmission housing H so as to be operated as a fixed element.

At this time, the sun gear S is splined to a fixed shaft 11 integrally protruded from the rear cover RC in the axial direction.

In addition, the planet carrier PC of the planetary gear set PS is rotatably supported by an exterior circumference of an extended portion of the sun gear S.

In addition, referring to FIG. 5, movement of a hub 15 splined to the outer shaft MS2 and connected to the rotor RT2 of the second motor/generator MG2 is limited in the axial direction by a snap ring SR2 mounted on the outer shaft MS2, and the snap ring SR2 is fixed to the outer shaft MS2 in the axial direction and in the radial direction by a fixing ring LR2. Therefore, decoupling of the snap ring SR2 is prevented when rotating with high speed.

In addition, referring to FIG. 3, the first clutch CL1 is splined to the input shaft IS at an opposite side of the first output gear OG1 with respect to the second output gear OG2. Referring to FIG. 4, the second clutch CL2 is rotatably supported on the input shaft IS and the outer shaft MS2 by ball bearings B2 and B3 between the first and second motor/generators MG1 and MG2.

Referring to FIG. 4, the second clutch CL2 is disposed between the first and second motor/generators MG1 and MG2 and is connected to the ring gear R of the planetary gear set PS and the rotor RT1 of the first motor/generator MG1 through the hub 13 connected to the rotor RT1 of the first motor/generator MG1.

In addition, referring to FIG. 2, a valve body VB and a tank TK for collecting a churning oil are disposed above the first clutch CL1 between the second motor/generator MG2 and the engine Eng in the transmission housing H. Therefore, a space in the transmission housing H can be utilized effectively and a cooling oil can be supplied to the second motor/generator MG2 easily.

According to various embodiments of the present invention, the planetary gear set PS disposed on the input shaft IS is positioned at the rearmost portion in the transmission housing H, and the sun gear S is splined to the rear cover RC. Therefore, axial load is supported by the rear cover RC and overall length of the transmission housing H may be shortened.

Since the second clutch CL2 is disposed between the first and second motor/generators MG1 and MG2 and is connected to the ring gear R of the planetary gear set PS and the first motor/generator MG1 without an additional connecting shaft, the number of components and weight may be reduced.

Since the parking gear PG is connected to the outer shaft MS2 having relatively large inertia, parking impact may be reduced.

In addition, since the tank TK for collecting the churning oil and the valve body VB are disposed above the first clutch CL1, cooling oil can be supplied to the second motor/generator MG2 easily when the vehicle runs at the EV mode and the space in the transmission housing H can be utilized efficiently.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission system of a hybrid electric vehicle comprising first and second motor/generators;
a planetary gear set;
first and second output gears;

first and second clutches on an axis of an input shaft receiving torque of an engine in a transmission housing; and a hollow shaft disposed at a radial exterior of the input shaft and adapted to transmit the torque of the engine or torque of the first motor/generator to the second output gear, an outer shaft disposed at a radial exterior of the hollow shaft and adapted to transmit torque of the second motor/generator to the first output gear, and a rear cover coupled to a rear end portion of the transmission housing, wherein the planetary gear set includes a sun gear, a planet carrier and a ring gear as rotation elements thereof and is disposed on a rear end portion of the input shaft in the transmission housing such that the sun gear is directly fixed to the rear cover.

2. The transmission system of claim 1, wherein the first clutch, the second output gear, the first output gear, the second motor/generator, the second clutch, the first motor/generator and the planetary gear set are sequentially disposed from an engine side to a rear of the transmission housing.

3. The transmission system of claim 2, further comprising a parking gear disposed between the first output gear and the second output gear and connected to the outer shaft.

4. The transmission system of claim 3, wherein a snap ring for fixing the parking gear in an axial direction and a fixing ring for fixing the snap ring in the axial direction and in a radial direction are mounted on the outer shaft.

5. The transmission system of claim 1, wherein the sun gear of the planetary gear set is splined to a fixed shaft integrally protruded from the rear cover in an axial direction.

6. The transmission system of claim 1, wherein the planet carrier of the planetary gear set is rotatably supported on an exterior circumference of the sun gear by a ball bearing.

7. The transmission system of claim 2, wherein the first clutch is splined to the input shaft at an opposite side of the first output gear with reference to the second output gear.

8. The transmission system of claim 2, wherein the second clutch is rotatably supported on the input shaft and the outer shaft by ball bearings between the first and second motor/generators.

9. The transmission system of claim 1, wherein a snap ring for fixing a hub connected to the second motor/generator in an axial direction and a fixing ring for fixing the snap ring in the axial direction and in a radial direction are mounted on the outer shaft.

10. The transmission system of claim 1, wherein the second clutch is connected to the ring gear of the planetary gear set through a hub connected to the first motor/generator.

11. The transmission system of claim 2, wherein a valve body and a tank for collecting churning oil are disposed above the first clutch in the transmission housing.

* * * * *